United States Patent
Rao et al.

(10) Patent No.: US 7,236,268 B2
(45) Date of Patent: Jun. 26, 2007

(54) ADAPTIVE SCREENING IN RASTER IMAGE PROCESSING OF COMPLEX PAGES

(75) Inventors: Pochiraju Srinivas Rao, Karnataka (IN); James G. Bearss, Boise, ID (US)

(73) Assignee: Texas Instruments Incorporated, Dallas, TX (US)

( * ) Notice: Subject to any disclaimer, the term of this patent is extended or adjusted under 35 U.S.C. 154(b) by 924 days.

(21) Appl. No.: 10/630,312

(22) Filed: Jul. 30, 2003

(65) Prior Publication Data

US 2005/0024684 A1    Feb. 3, 2005

(51) Int. Cl.
*H04N 1/405* (2006.01)
*G06K 15/02* (2006.01)

(52) U.S. Cl. .................. 358/2.1; 358/3.06; 358/3.24; 358/1.13

(58) Field of Classification Search ............. 358/1.9, 358/2.1, 3.06, 3.21, 3.24, 1.11, 1.13, 1.15, 358/534, 536; 715/526, 911
See application file for complete search history.

(56) References Cited

U.S. PATENT DOCUMENTS

| 5,552,898 | A | * | 9/1996 | Deschuytere | 358/1.15 |
| 5,748,860 | A | * | 5/1998 | Shively | 358/1.15 |
| 5,758,042 | A | * | 5/1998 | Deschuytere | 358/1.15 |
| 6,738,153 | B1 | * | 5/2004 | Aschenbrenner et al. | 358/1.14 |

* cited by examiner

*Primary Examiner*—Scott A. Rogers
(74) *Attorney, Agent, or Firm*—Robert D. Marshall, Jr.; W. James Brady; Frederick J. Telecky, Jr.

(57) ABSTRACT

A method of data processing is described for generating a screened bitmap in an adaptive manner. The page being printed is subdivided into a plurality of smaller areas, and the optimal screening method is selected based on the content of the data being processed. Areas of the page that primarily comprise of graphic elements and/or fonts are screened as part of the rendering process, while areas that are primarily continuous tone elements are screened as a secondary step after the rendering process.

8 Claims, 1 Drawing Sheet

ADAPTIVE SCREENING IN RASTER IMAGE PROCESSING OF COMPLEX PAGES

TECHNICAL FIELD OF THE INVENTION

The technical field of this invention is the field of raster image processing, and more specifically to a new and improved method of optimization of the screening of the bitmap representation to the print engine's resolution.

BACKGROUND OF THE INVENTION

When printing a document, the page to be printed is typically composed electronically using software like QuarkXpress, Framemaker, etc. Internally the page is stored in a vector based graphical representation by these composition tools. This representation is then usually converted to another representation called a page description language (PDL). Some composition tools generate the PDL directly. To print the page, the PDL representation is sent to the printer. Before display or printing, a raster image processor (RIP) converts the PDL representation of the page to a raster (bitmap) representation at the desired resolution.

This conversion process can usually be divided into two stages: interpretation and rendering. Interpretation reduces the original page description to a series of drawing primitives called the display list. Rendering converts these drawing primitives into a bitmap in the frame buffer.

At high resolutions, a significant amount of memory is required to store this bitmap image. As an example, an 8.5" by 11" or A4 size page at a resolution of 600 dots per inch (dpi), 8 bits/pixel and 4 color planes will require about 128 megabytes of frame buffer memory.

In order to reduce the memory requirement, the page may be divided into smaller portions or bands. The band size is determined by the available frame buffer memory. Each band is then converted to bitmap form and passed on to the exposure module of the printer to make space for the subsequent bands.

In a typical non-impact printer the exposure module has to be fed with bitmap data at regular intervals. Thus each band must be rendered in a predefined time. As rendering is computationally intensive and is influenced by the page content, such real-time rendering may not be possible for complex bands. In some cases real-time rendering may not be possible even though the bands are not complex. If the available memory is limited, there may not be sufficient room to store the original display list and other information required for rendering the page. If this is the case, each band must be pre-rendered, compressed and stored. After all the bands have been processed and compressed, they are decompressed in real time and fed to the exposure module.

One of the more common page description languages is the Postscript language from Adobe Systems, Inc. The Postscript language is a programming language designed to convey a description of virtually any desired page to a printer or display. Postscript page descriptions are programs that are executed by the Postscript interpreter. The Postscript programs are usually generated by application programs executing on other computers.

The rendering engine(s) usually generate the bitmap representation of the page to be printed in a device independent format with a pixel depth of 8 bits. Since the print engines have variable pixel depths depending on the quality required, the bitmap has to be processed to match the print engine's resolution, usually one, two or four bits.

Printers are usually binary devices, the output on the paper either has ink or it does not. In order to print a continuous tone image, a technique called screening is employed. In prior art, non-electronic printers a physical screen was employed to break up the picture into a plurality of small areas. Continuous tones were simulated by either controlling the size of a single ink dot within each screen opening, or by using a fine screen, and dedicating multiple openings to each visible dot. In the case of a 4 bit resolution printer, a 4×4 block was used, with the appropriate number of screen openings having ink to match the input binary value. With a 4×4 block, 16 gray scale values were possible. This process is also called dithering. In a fully electronic printer, the screening is done in software instead of using a mechanical screen.

SUMMARY OF THE INVENTION

This invention selects the optimal screening algorithm in an adaptive manner dependent upon the content of the page being printed. The page being printed is subdivided into a plurality of smaller areas, and the content of each area is examined during processing.

If the area primarily includes graphic elements and fonts, a screening operation is selected that is tightly integrated with the rendering function. The rendering engine directly generates the bitmap screened to the required resolution.

If the area being processed primarily comprises of continuous tone elements, the rendering and screening functions are isolated. The rendering engine generates a higher resolution bitmap, and a screening function then operates on this bitmap to generate the final bitmap, screened to the desired resolution.

BRIEF DESCRIPTION OF THE DRAWINGS

These and other aspects of this invention are illustrated in the drawings, in which.

DETAILED DESCRIPTION OF PREFERRED EMBODIMENTS

The problem addressed by the present invention is how to efficiently implement the screening function in an image processor system.

The screening function may take place two ways. The rendering function that converts the display list into a bit map may be done at a fixed 8 bit resolution and then the output may be screened in a separate operation. Alternately, the screening may be tightly integrated into the rendering function. In this case, the output of the rendering function will be the screened bitmap, ready to be sent to the print engine.

Prior art implementations of the screening function used either the first or the second approach. Experimental data indicates that the second approach integrating the rendering and screening is faster if the band being processed is primarily graphics and fonts, while the first approach using separate rendering and screening functions is faster for bands that contain primarily continuous tones. In the present invention the choice of the screening method to be used is selected during processing, depending on the content of the band being processed. This approach optimizes the processing flow, by adaptively selecting the best algorithm to be employed.

Figure 1:
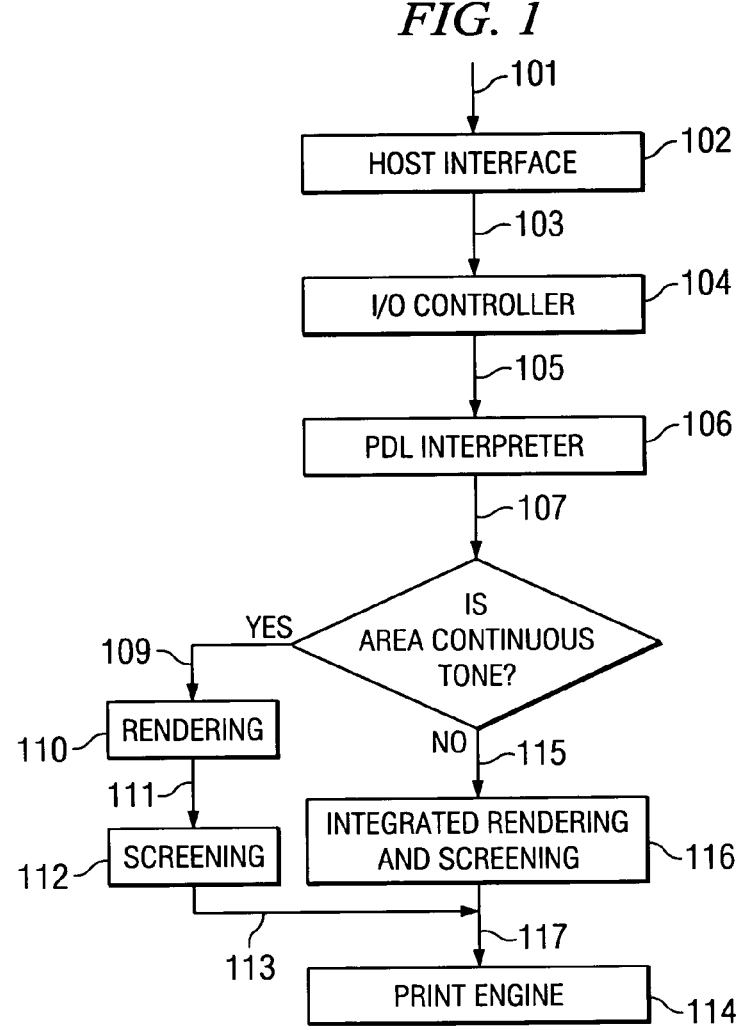
FIG. 1 illustrates if flow chart form the steps of the present invention.

FIG. 1 illustrates an embodiment of this technique in flow diagram form. Host interface 102 receives the input PDL representation through bus 101. Host interface 102 is then coupled to I/O controller 104 through bus 103. The binary output of block 104 is routed via bus 105 to the PDL interpreter function 106. The PDL interpreter 106 executes the PDL language and generates a display list consisting of printing primitives.

Decision block 108 receives the display list through bus 107 and determines whether the band being processed primarily continuous tone or not.

If the band is primarily composed of continuous tone elements (Yes at decision block 108), the data is coupled to rendering function 110 via bus 109. Rendering function 110 converts the display list into a bitmap with a resolution of 8 bits per pixel. Screening function 112 receives the generated bitmap via bus 111, performs the screening function to the required resolution and then outputs the screened data to print engine 114 via bus 113.

If the band being processed is not primarily composed of continuous tone data (No at decision block 108), the display list is routed to integrated rendering and screening function 116 via bus 115. Integrated rendering and screening function 116 then performs the integrated rendering and screening operation and generates the screened bitmap representation of the display list. This bitmap is then routed via bus 117 to the print engine 114.

Figure 2:
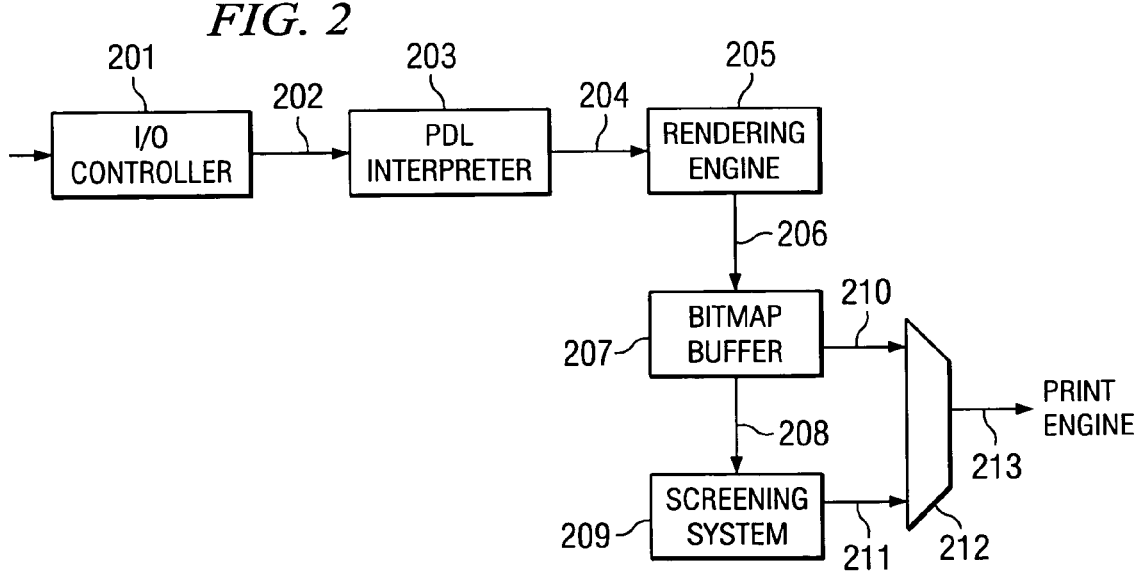
FIG. 2 illustrates in block diagram form an image data processor implementing the present invention.

FIG. 2 illustrates a raster image processing system implementing the present invention. The PDL representation of the page being printed is received by I/O controller 201. After processing, I/O controller 210 supplies the binary data to PDL interpreter block 203 through bus 202. PDL interpreter block 203 executes the PDL language and generates a display list composed of drawing or printing primitives. Rendering engine 205 receives this display list through bus 204 and generates a bitmap that is dependent on the content of the band or area being processed. If the band is primarily composed of continuous tone elements, the rendering engine generates an 8 bit resolution bitmap. This bitmap is then coupled to screening unit 209 via bus 208. After the screening function is performed by screening unit 209, the resultant screened bitmap is supplied multiplexer circuit 212 via bus 211 and output to the print engine through bus 213.

If the band being processed is primarily composed of graphics and/or fonts, rendering engine 207 will perform an integrated rendering and screening function and generate the screened bitmap directly. This bitmap is routed to the print engine through bus 210, multiplex circuit 212 and bus 213.

Although the invention has been described in detail with reference to its preferred embodiments, it is to be understood that this description is by way of example only and is not to be construed in a limiting sense.

Moreover, numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A method of raster image data processing comprising the steps of:
   determining content of a page to be printed;
   adaptively generating a screened bitmap output by selectively
     rendering the page to be printed into a fixed pixel depth bitmap and then screening the fixed pixel depth bit map to a printer specific pixel depth, and
     rendering and screening the page to be printed in an integrated manner into a bitmap having the printer specific pixel depth.

2. The method of claim 1 further comprising the steps of:
   dividing a page being processed into a plurality of smaller areas; and
   said step of adaptively generating a screened bitmap output for each area determined by content of said areas.

3. The method of claim 2 wherein:
   said step of adaptively generating a screened bitmap output is performed in an integrated manner if an area of the page is primarily comprised of graphic and font elements.

4. The method of claim 2 wherein:
   said step of adaptively generating a screened bitmap output is preformed by rendering at a higher resolution a non-screened bitmap, then screening said non-screened bitmap to implement the desired screening function if an area of the page is primarily comprised of continuous tone elements.

5. A data processing system comprising:
   an I/O controller for receiving a page description language representation of a page to be processed;
   a page description language interpreter for executing said page description language representation of said page and generating a display list representation of said page;
   a rendering engine having a first mode for converting said display list representation of said page into an 8-bit bitmap representation and a second mode for converting said display list representation of said page into a lower resolution screened representation;
   a screening system operable on the bitmap generated by said rendering engine for generating a screened bitmap; and
   a decision system selecting said first mode or said second mode dependent upon content of an area being printed.

6. The data processing system of claim 5 wherein:
   said screening system is integrated into said rendering engine for generating a final screened bitmap output.

7. The data processing system of claim 5 wherein:
   said screening system is implemented as a separate function that operates on the output of said rendering engine.

8. The data processing system of claim 7 wherein:
   said rendering engine and said screening system are integrated but operate in a serial manner first rendering a higher resolution bitmap then screening said bitmap.

* * * * *